United States Patent
Chen (10) Patent No.: US 12,061,122 B2
(45) Date of Patent: Aug. 13, 2024

(54) METHOD AND SYSTEM UTILIZING ABSOLUTE VELOCITY TO IMPROVE THE PERFORMANCE OF ELECTROMAGNETIC DEVICES

(71) Applicant: Qian Chen, Grandville, MI (US)

(72) Inventor: Qian Chen, Grandville, MI (US)

(*) Notice: Subject to any disclaimer, the term of this patent is extended or adjusted under 35 U.S.C. 154(b) by 855 days.

(21) Appl. No.: 17/175,178

(22) Filed: Feb. 12, 2021

(65) Prior Publication Data

US 2022/0260427 A1   Aug. 18, 2022

(51) Int. Cl.

| | |
|---|---|
| *G01P 3/36* | (2006.01) |
| *G01J 7/00* | (2006.01) |
| *G01M 11/00* | (2006.01) |
| *G09B 23/22* | (2006.01) |

(52) U.S. Cl.
CPC ............ *G01J 7/00* (2013.01); *G01M 11/335* (2013.01); *G09B 23/22* (2013.01)

(58) Field of Classification Search
CPC .......... G01J 7/00; G01M 11/335; G09B 23/22
See application file for complete search history.

(56) References Cited

U.S. PATENT DOCUMENTS

| | | | |
|---|---|---|---|
| 2007/0222971 A1* | 9/2007 | Brauns | G01P 3/50 |
| | | | 356/28 |
| 2018/0188032 A1* | 7/2018 | Ramanandan | G01S 19/52 |
| 2020/0150677 A1* | 5/2020 | Walters | G05D 1/0225 |
| 2022/0085892 A1* | 3/2022 | Sorge | H04B 10/524 |

FOREIGN PATENT DOCUMENTS

| | | | | |
|---|---|---|---|---|
| DE | 102010050804 B4 | * | 11/2010 | G01S 19/52 |
| DE | 102013016198 A1 | * | 4/2015 | G01P 3/68 |
| WO | WO 2005005993 A1 | * | 7/2003 | B60C 23/061 |

OTHER PUBLICATIONS

Chen, Asymmetry Theory From the Principle of Constant Light Speed, International Education Foundation, (2021), pp. 1-9.*

* cited by examiner

*Primary Examiner* — Mark Hellner (57) ABSTRACT

The method and system utilized the measurement of the "absolute" velocities or equivalent parameters of the electromagnetic devices and objects, which are defined as the velocities relative to the real origin of the electromagnetic wave, to accurately picture their impacts on the propagation and measurement of the electromagnetic wave and compensate for these impacts correspondingly. The comprehensive information of the "absolute" velocities, including both the measured values and the calculated right timings, is utilized to calibrate and control the electromagnetic device and calculate the results to improve performance and accuracy. The method and system include the absolute velocity measurement, the calibration and control of the device, and the computation of the right timings and results.

18 Claims, 7 Drawing Sheets

METHOD AND SYSTEM UTILIZING ABSOLUTE VELOCITY TO IMPROVE THE PERFORMANCE OF ELECTROMAGNETIC DEVICES

CROSS-REFERENCE TO RELATED APPLICATIONS

Not-applicable

FEDERALLY SPONSORED RESEARCH OR DEVELOPMENT

Not-applicable

BACKGROUND OF THE INVENTION

Field of the Invention

This invention is generally related to the electromagnetic based device and more specifically related to electromagnetic measurement, detection, and positioning.

Description of Related Art

The movements of the electromagnetic device and its targeted objects will impact the propagation, and hence the measurement, detection, and positioning, of the electromagnetic wave. Therefore, it is important to determine the velocities information and include it in both the settings of the device and the calculations to get optimal performance and accurate results. Up to now, all electromagnetic devices only measured and utilized the so-called "relative" velocities based on the chosen reference frame. For example, the GPS may use the velocity of its satellite relative to the solar system; the radar in a jet may use its velocity relative to the earth or atmosphere; the optical mask aligner is considered at rest, i.e. using its "relative" velocity to the earth of 0. As an example, a common formula to determine the Dopler effect on the sending and receiving frequencies, $f_s$ and $f_o$, of an electromagnetic wave is only using the value of "relative" velocity between the object and the emission source, $v_{rel}$:

$$\frac{f_s}{f_o} = \frac{c}{c - v_{rel}}$$

where c is the constant light speed.

According to a new theory called "Asymmetry Theory", the problem with current technology is that these "relative" velocities are not equivalent to the "absolute" velocities that have the actual effect on the propagation and measurement of the electromagnetic waves. Here, the term "absolute" velocity is defined as the velocity of an object relative to the real origin of the electromagnetic wave according to Asymmetry Theory, which is invariant to the choice of the reference frame. It is important to distinguish the real origin of the electromagnetic wave from the position of the physical emitter. Since the origin doesn't always coincide with a physical position, the measurement of the absolute velocity is not straightforward. Furthermore, the comprehensive information of absolute velocities is required to accurately picture the actual effect on the propagation of the electromagnetic wave. Due to the delay of electromagnetic wave propagation, this comprehensive information must also include the right timings of the absolute velocities. As an example, the following formula in Asymmetry Theory accurately describes the Dopler effect of electromagnetic waves in a vacuum:

$$\frac{f_s(t_s)}{f_o(t_o)} = \frac{c - v_s(t_s)}{c - v_o(t_o)}$$

where $v_s(t)$ and $v_o(t)$ are the "absolute" velocities of the emission source and receiver respectively, $t_o$ and $t_s$ are the times that the electromagnetic wave is received and emitted respectively. Therefore, to accurately calculate the difference between the sending frequency $f_s$ $(t_s)$ and the receiving frequency $f_o$ $(t_o)$, it requires comprehensive absolute velocity information, including the absolute velocities $v_s$ (t) and $v_o$ (t), and the right timings $t_o$ and $t_s$.

Figure 1:
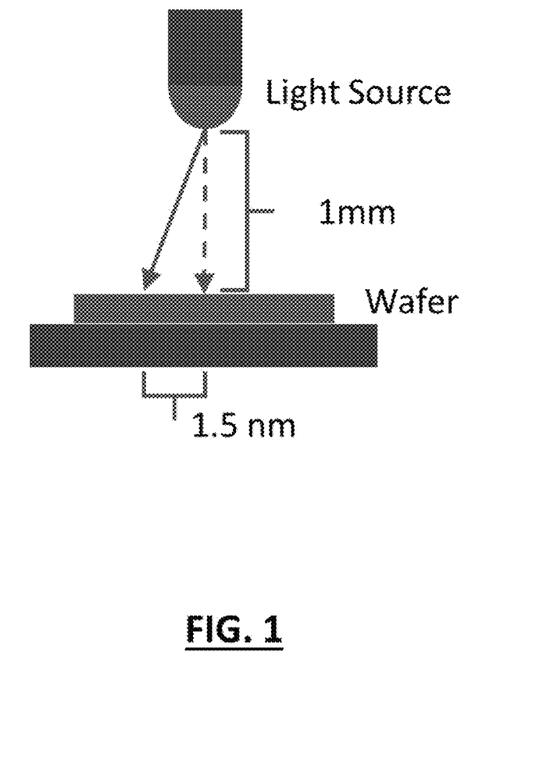
FIG. 1 shows an example of potential positioning error for an optical mask aligner assumed "at rest" under previous art

Hence, current technology using only "relative" velocity will inevitably result in the approximation error which impacts the performance of the device and the accuracy of results. As an example, FIG. 1 shows the estimation of the potential error with the example of an optical mask aligner considered "at rest". Assuming the light source is 1 mm from the wafer, the variation between the actual position where the light reaches the wafer and the targeted position can be up to 1.5 nm, which can be a concern for precision positioning. The search for related publications and information showed that this problem of only using "relative" velocity was never resolved before this invention.

BRIEF SUMMARY OF THE INVENTION

This invention presents a system design and method utilizing the comprehensive "absolute" velocity information to improve the performance and accuracy of any device using electromagnetic measurement, detection, and positioning. This system and method will measure the absolute velocities, determine the right timings, apply this information to calibrate and control the device, and compute the results. Because the actual electromagnetic propagation and measurement are determined by this comprehensive "absolute" velocity information, this invention enables the devices to utilize a more accurate picture of the actual electromagnetic propagation, and correspondingly produce better performance than the current technology using "relative" velocity.

BRIEF DESCRIPTION OF THE DRAWINGS

FIG. 4(a) uses the travel time. FIG. 4(b) uses the angle and position. FIG. 4(c) compares different directions.

FIG. 5(a) uses flat reflections. FIG. 5(b) uses curved reflections.

DETAILED DESCRIPTION OF THE INVENTION

The following description is merely exemplary in nature and is not intended to limit the present disclosure, application, or uses. It should be understood that throughout the drawings, corresponding reference numerals indicate like or corresponding parts and features. As used herein, the term module refers to one or more application-specific integrated circuit (ASIC), electronic circuits, processors (shared, dedicated, or group), and memory that executes one or more software or firmware programs, combinational logic circuits, electromagnetic sources, detectors, electrical circuits, movement units, and/or other suitable components that provide the described functionality.

This invention presents a method and system design that enables the users of utilizing the comprehensive "absolute" velocity information to improve the performance and accuracy of any device using electromagnetic measurement, detection, and positioning. The system design includes modules for the absolute velocity measurement, the calibration and control of the device, and the computation of results respectively. The method includes various techniques to measure the absolute velocity or its equivalent parameters and additional techniques to improve the measurement accuracy. The method generates the comprehensive absolute velocity information by recording the timings of the measured absolute velocities, storing the time-series, and calculating the right timings. This information is utilized to calibrate and control the device and improve the accuracy of calculated results.

Figure 2:
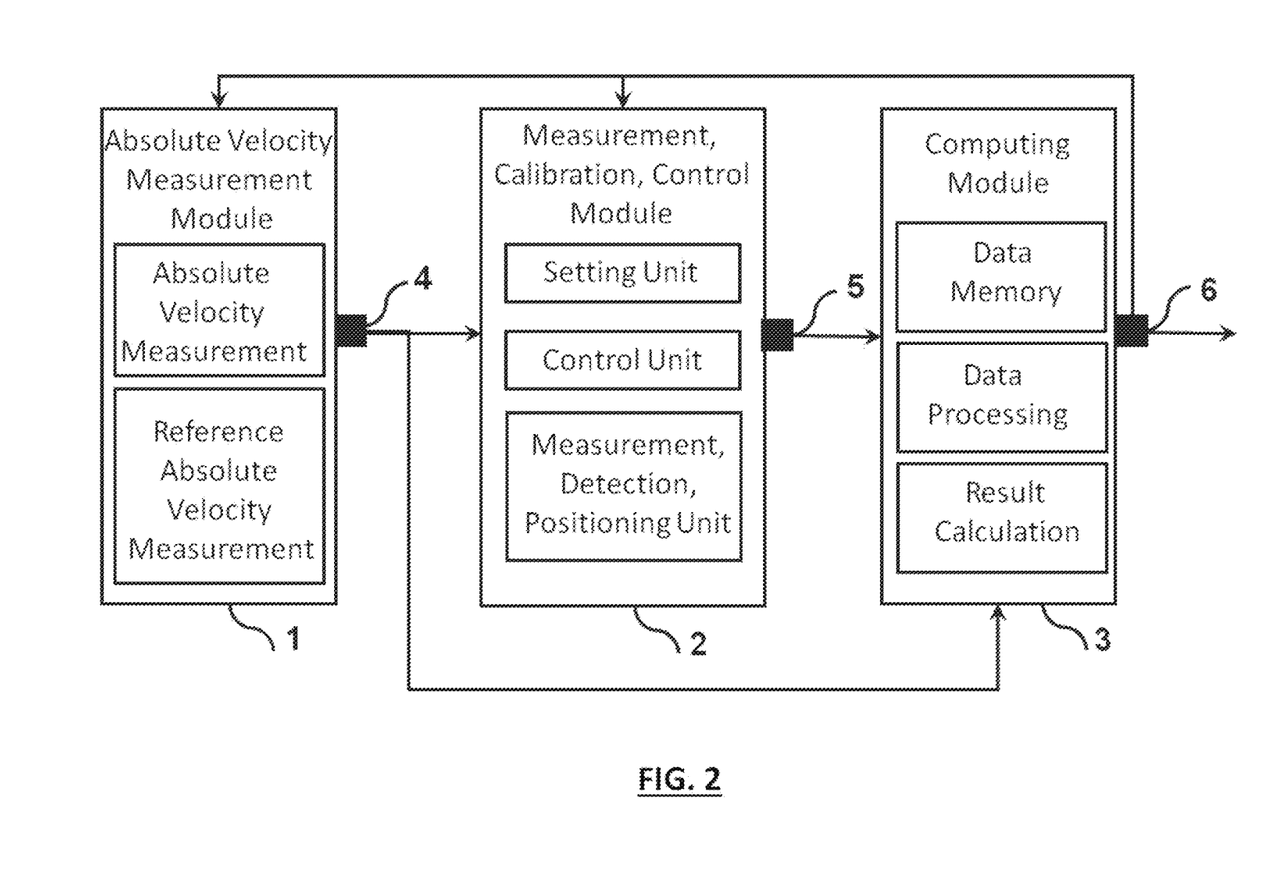
FIG. 2 shows the architecture design of the system for electromagnetic-based measurement, detection, and positioning using the absolute velocity or equivalents

FIG. 2 shows the architecture design of the system, comprising at least one or more modules for the absolute velocity measurement 1; one or more modules for the electromagnetic measurement, calibration, and control 2; and one or more modules for the computing of the results with the comprehensive information of the measured absolute velocities 3. These modules are connected with communication channels 4, 5, 6. The information of measured absolute velocities or equivalents from 1 is sent through channel 4 to the measurement, calibration, and control module 2 for utilization. The measured information from both module 1 and module 2 is sent through channels 4 and 5 to the computing module 3 to calculate the results. Furthermore, the calculated results from the computing module 3, for example, the calculated timings, can be sent out or fed back to modules 1 and 2 for utilization through channel 6.

Figure 3:
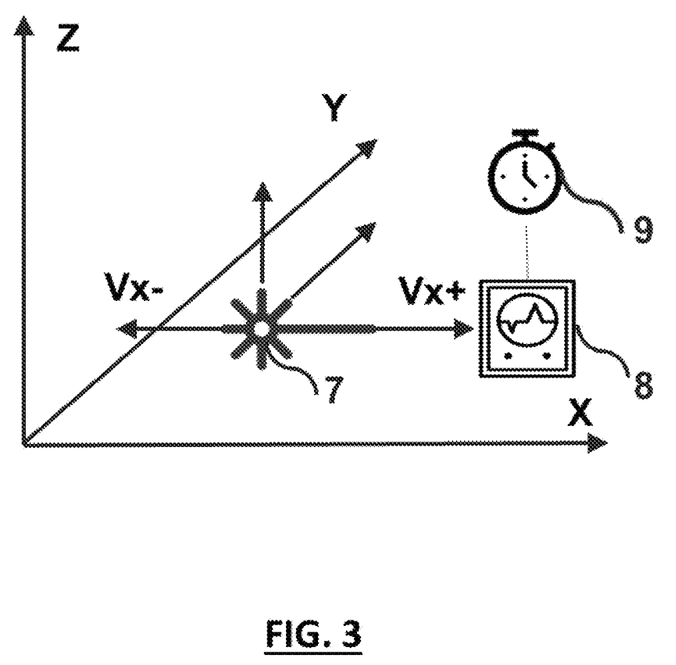
FIG. 3 shows the design of the absolute velocity measurement module

FIG. 3 shows the design of the absolute velocity measurement module, which includes at least one or more light sources 7 and one or more detectors 8 for measuring one or more parameters directly related to the absolute velocity, including but not limited to time, position, displacement, angle, velocity, frequency, energy, and wavelength. The timing of the measurement will also be recorded with one or more clocks 9. Optionally, additional units, such as a reflection device amplifying these measured parameters, see FIG. 5, may be included. In order to get a complete picture of the absolute velocity, the absolute velocity should be measured in at least 3 independent directions, for example, the x,y,z as shown in FIG. 3.

Since the absolute velocity is the velocity of the object relative to the real origin of the electromagnetic wave which doesn't always coincide with a physical position, its measurement is not straightforward. The principle of measuring the absolute velocity is to measure its effects on the propagation of the electromagnetic wave, which may be represented in the differences of key parameters, for example, velocity, time, angle, position, displacement, frequency, energy, and wavelength. The absolute velocity can be explicitly calculated from one or more of these measured parameters. Alternatively, because these measured parameters are equivalent to the absolute velocity as to their effects on the propagation of the electromagnetic wave, we can instead directly use them as equivalent information of absolute velocity to improve system performance. Hence, these measured parameters are also called the "equivalents" of the absolute velocity.

Figure 4:
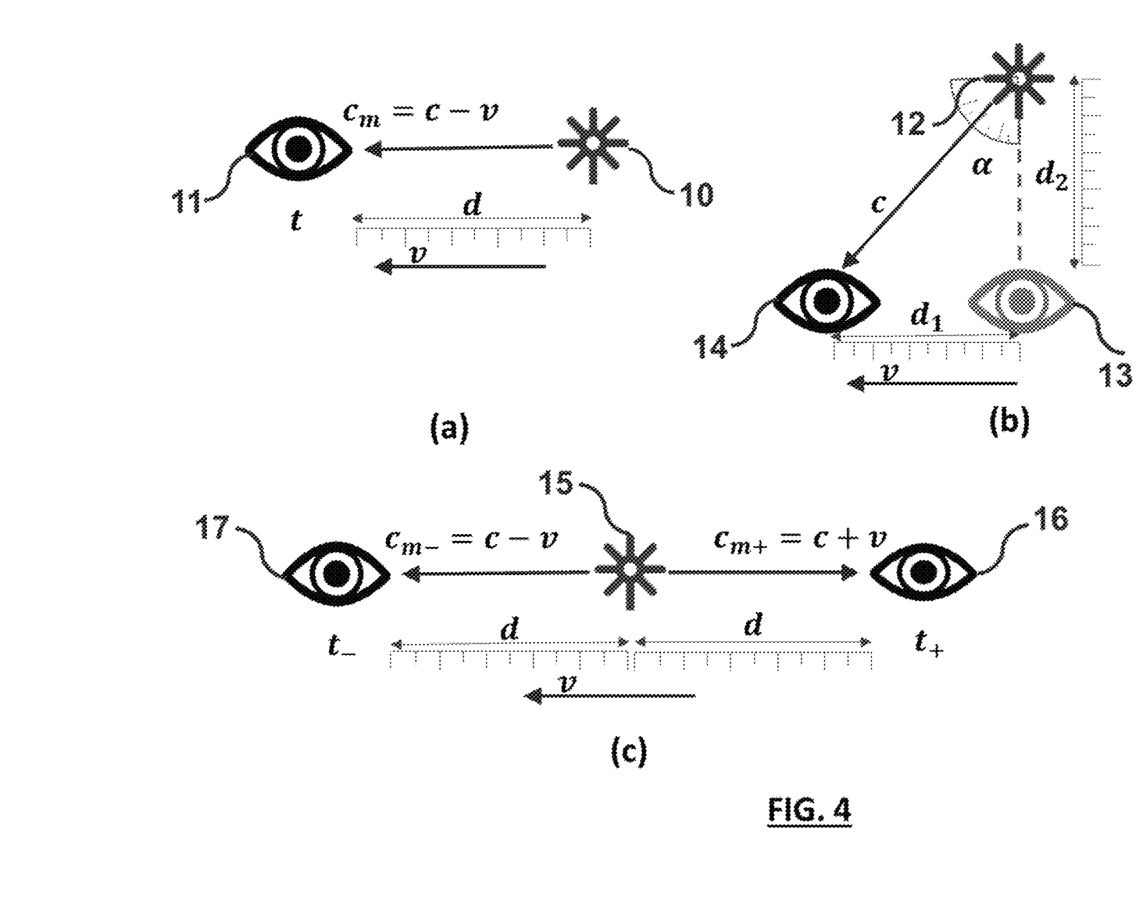
FIG. 4 shows examples of different methods of measuring the absolute velocity.

FIG. 4 shows examples of different methods of measuring the absolute velocity with some of the key parameters. As one example in FIG. 4(*a*), we can use various existing methods to measure the light velocity between the emission source 10 and the receiving detector 11, denoted as $c_m$. Assuming the absolute velocity of the module is v, then $c_m=c-v$, where c=299792 km/s is the constant light speed. The absolute velocity v can be calculated as:

$$v=c-c_m$$

Another example in FIG. 4(*a*) is to use the measured time. Assume that the distance between the source 10 and detector 11 is d. We measure the time t taken for detector 11 to receive the electromagnetic wave, which should be t=d/(c−v). Therefore, the absolute velocity v is:

$$v=c-d/t$$

The third example in FIG. 4(*b*) is to measure the angular displacement due to the absolute velocity of the module v. Assume we want to measure the absolute velocity v which is perpendicular to the direction from the light source 12 to the detector 13 at the time of emission. The movement constitutes an angle of α in the receiving end with the detector at position 14 at the time of detection, the value of the absolute velocity v is:

$$v=c*\sin(\alpha)$$

The fourth example in FIG. 4(*b*) is to measure the position displacement due to the absolute velocity of the module v. Assume we want to measure the absolute velocity v which is perpendicular to the direction from the light source 12 to the detector 13 at the time of emission. The distance from the light source 12 to the detector 13 at the time of emission is $d_1$ and to the detector 14 at the time of detection is $d_2$. The value of the absolute velocity v is:

$$v=c*d_1/\sqrt{d_1^2+d_2^2}$$

FIG. 4(*c*) shows a further improvement to measure the light velocity of the module in different directions and use the difference of the light velocity to calculate the absolute velocity. This method will cancel out the constant light speed c and provide better accuracy. For example, if we measure the light velocities from the emission source 15 towards detectors 16 and 17 in opposite directions, the measured light velocities as to detectors 16 and 17 are $c_{m+}=c+v$ and $c_{m-}=c-v$ respectively. Then the value of the absolute velocity v is:

$$v=(c_{m+}-c_{m-})/2$$

Similarly, we can also measure the time difference for light traveling in different directions and then use the difference of time to calculate the absolute velocity. For example in FIG. 4 (c), if the measured travel time from the emission source 15 towards detectors 16 and 17, which have the same distance d but in opposite directions, are $t_+$ and $t_-$ respectively, the value of the absolute velocity v is:

$$v = \left(\frac{d}{t_+} - \frac{d}{t_-}\right)/2$$

We can also measure the frequency variation of the detector by varying the velocity of the detector relative to the light source. For example, assuming the transmitted frequency is $f_s$, the received frequencies are $f_0$ and $f_1$ when the relative velocities of the detector are $v_0$ and $v_1$ respectively. The absolute velocity v can be determined as $$v = c - \frac{f_s}{(f_0 - f_1)(v_0 - v_1)}$$

Since the frequency is directly related to the wavelength and energy of the light, therefore, it is equivalent to measure the wavelength and energy of the light instead of the frequency.

Figure 5:
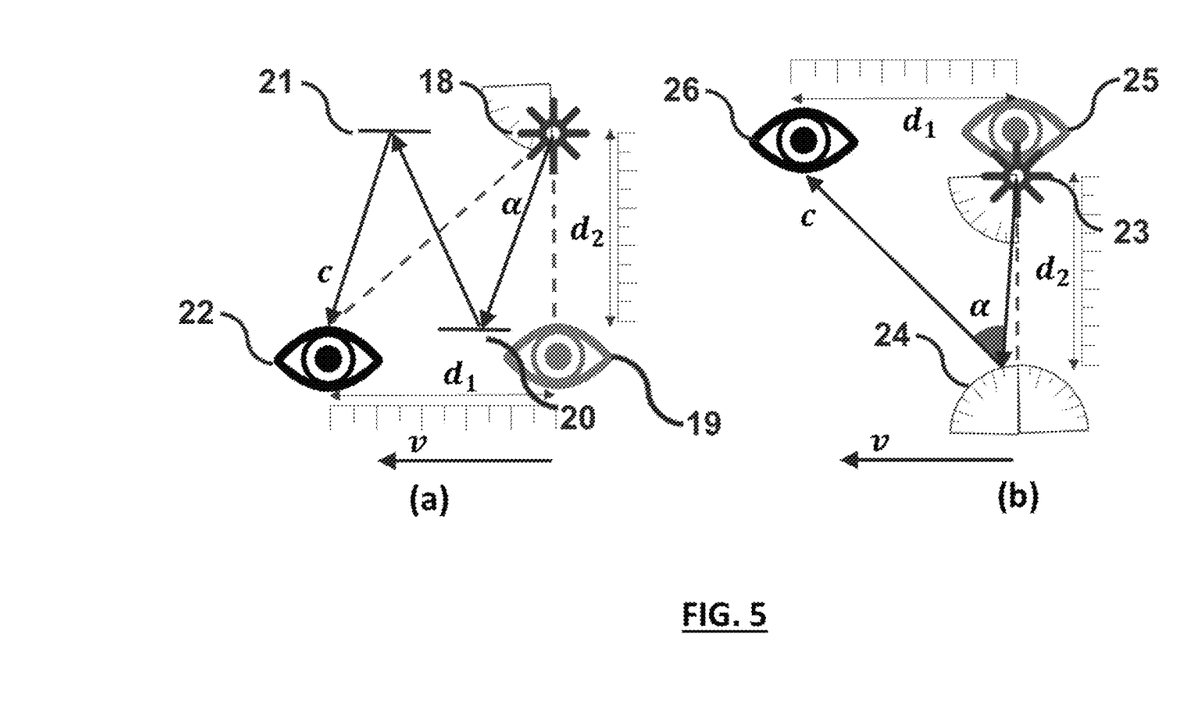
FIG. 5 shows examples of methods of amplifying the absolute velocity measurement.

In order to make the above measurements of absolute velocity easier and more accurate, it is beneficial to have methods that will amplify the measured difference of parameters, for example, position and angle. FIG. 5 shows some examples of the methods by reflection. FIG. 5(a) shows the method of amplifying the measured angle and distance through multiple reflections of the light. The light emitted from the light source 18 will be reflected by several mirrors, for example, 20 and 21, before reaching the detector at 22. For the same distance of $d_2$ between the light source 18 and the original position of the detector at 19, the displacement $d_1$ caused by the absolute velocity is amplified by n+1 times compared to that without reflection, where n is the total number of reflections. The value of the absolute velocity v is:

$$v = c*d_1/\sqrt{d_1^2 + (n+1)*d_2^2}$$

The angle α is also amplified by the reflections. The value of the absolute velocity v is:

$$v = c/\sqrt{1 + (n+1)*\cot(a)^2}$$

Instead of using a flat reflection device, another example is using a curved or angled reflection device to amply the measured difference of position and/or angle caused by the absolute velocity. FIG. 5(b) shows that the light emitted from the light source 23 is reflected by a curved or angled reflection 24 before reaching detector 26. As FIG. 5(b) shows, the displacement is amplified to $d_1$ and the angle is amplified to α. The exact amplification factor will be determined by the curvature or angle of reflection 24.

There are different options to measure the absolute velocity of a device or object. One option is to use the module to measure the absolute velocity of the device or object directly, which is more accurate but the implementation may be more challenging. The other option is to first measure the absolute velocity of a reference inertia system, by simply fixing the absolute velocity measurement module in the reference inertia system. Then the absolute velocity of a device or object can be calculated by adding its relative velocity to this reference system. The absolute velocities and equivalents can be measured either real-time or offline and stored for usage later.

This invention utilizes the comprehensive absolute velocity information to accurately picture the actual effect of the movements of the device and object on the propagation and measurement of the electromagnetic waves. First, all available absolute velocities or equivalents of the emission source, the receiving end, and the objects will be measured or calculated. Furthermore, this comprehensive information includes not only the values but also the right timings of the absolute velocities. For example, to use the correct Dopler effect formula, this invention utilizes the absolute velocity of the emission source at $t_s$, $v_s(t_s)$, and the absolute velocity of the receiving end at $t_o$, $v_o(t_o)$, where $t_s$ is the time the electromagnetic wave is emitted and $t_o$ is the time it is received.

Figure 6:
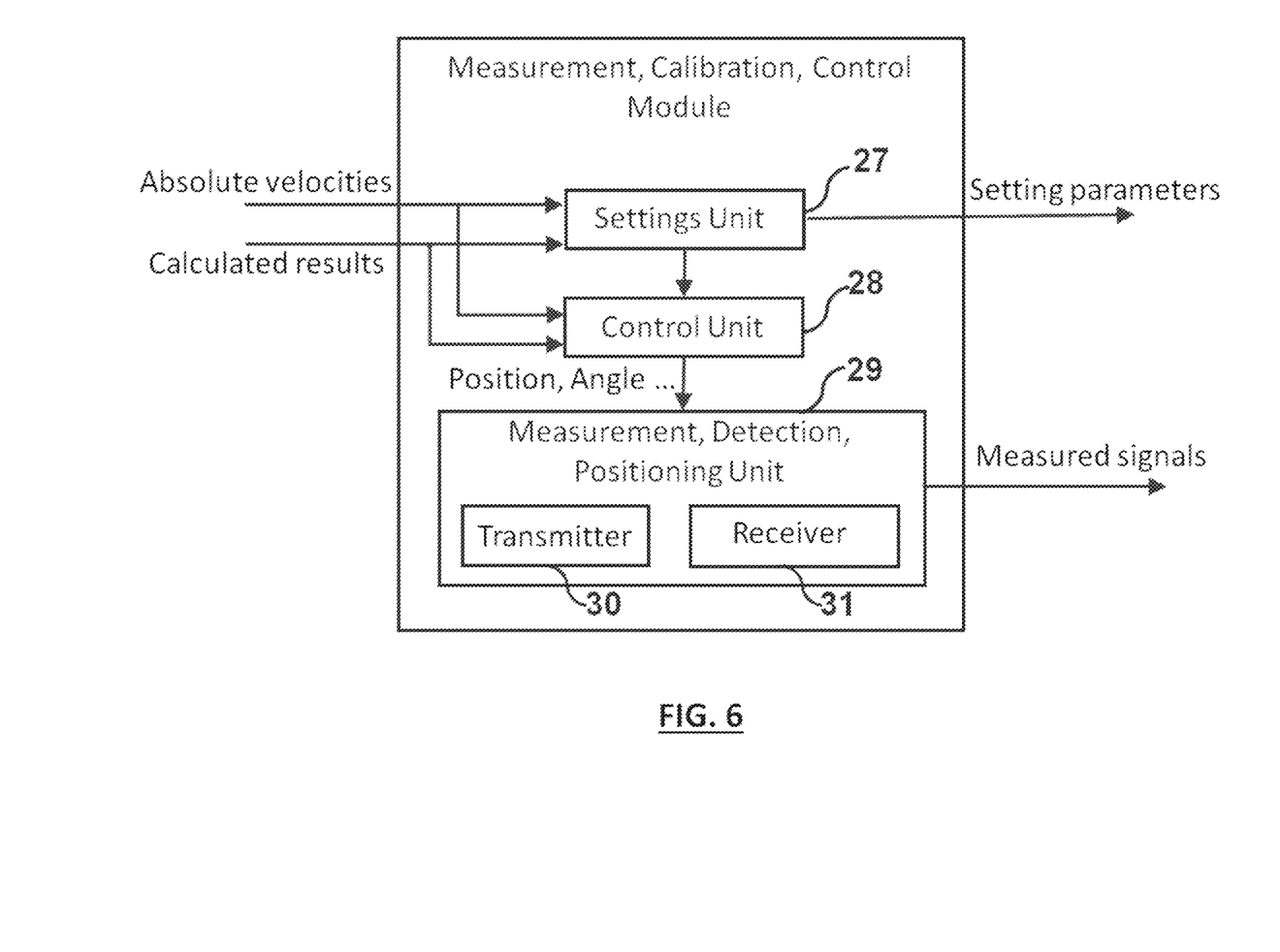
FIG. 6 shows the design of the measurement, detection, and positioning module

FIG. 6 shows the design of the electromagnetic measurement, calibration, and control module 2. The module includes at least one or more electromagnetic measurement, detection, and positioning units 29, which may further include one or more electromagnetic transmitters 30 and receivers 31. The module also includes one or more setting units 27 that will determine and calibrate the settings of the device. Furthermore, the module includes one or more control units 28 that will control the device to the desired settings, for example, the position, angle, velocity, timing, frequency, and power. The inputs to the module include all the measured absolute velocities or equivalents, and the calculated results fed back from the computing module. The outputs from the module include the device settings and states and the measured signals from 29.

Setting Units 27 use the comprehensive absolute velocity information to determine and calibrate the settings of the device, for example, the transmitting and receiving frequency and timing, the angle/position/velocity of the emitting sources and/or receiving ends, to optimize the performance of, for example, measurement, detection, and positioning. For example, the angle between the transmitted electromagnetic wave and the object will greatly impact the performance. The right angle for optimal performance can only be accurately calculated with the comprehensive absolute velocity information.

Control Units 28 use the comprehensive absolute velocity information to control the device to the desired settings. For example, there is a time delay between the measured position or velocity of the object and the actual position or velocity. This delay can be accurately calculated with the comprehensive absolute velocity information. Unit 28 can use this calculated delay to predict the movement of the object so that it can control the electromagnetic wave to better follow the object.

Figure 7:
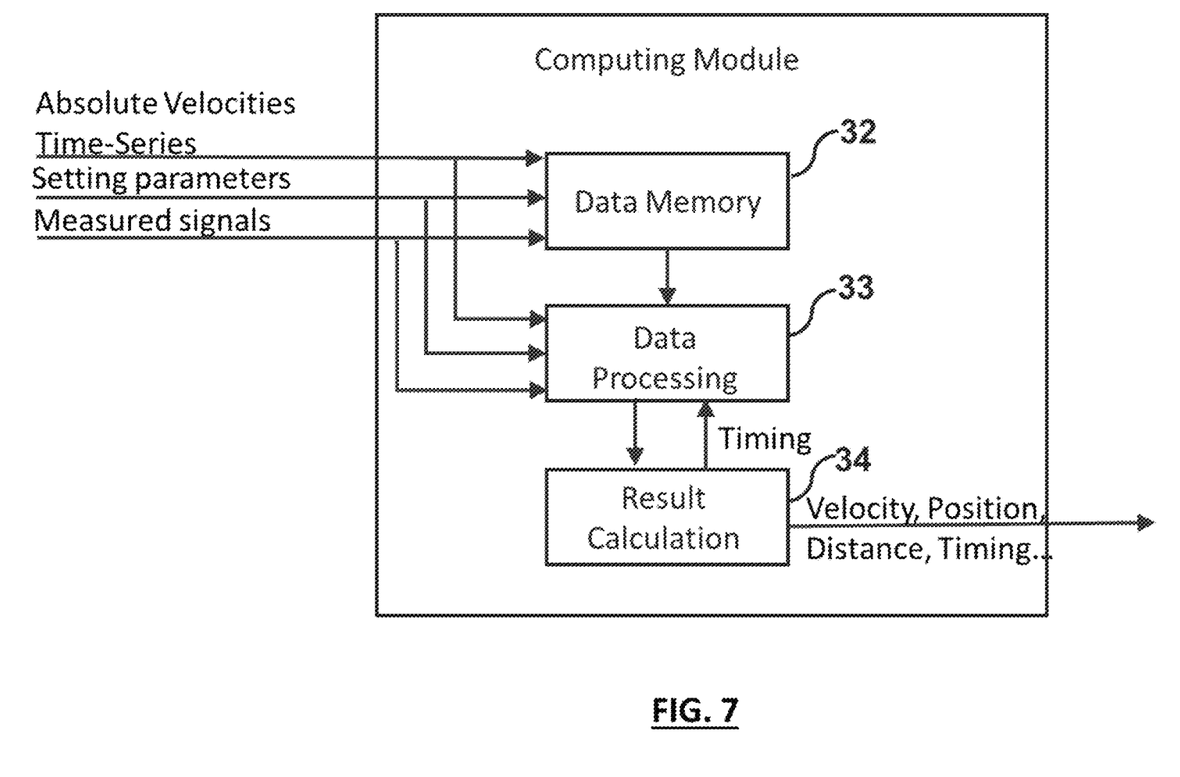
FIG. 7 shows the design of the computing module

FIG. 7 shows the design of the computing module 3, which includes at least one or more data memory units 32, data processing units 33, and calculation units 34. The inputs to the module include all the time series of the measured absolute velocities or equivalents from module 1; the settings and states of the device and the measured signals from the measurement, calibration, and control module 2. The outputs from the module include all the calculated results, which will also be fed back to modules 1 and 2 for utilization.

To utilize the comprehensive absolute velocity information to accurately calculate the results, the computing module will first store all the time-series of the measured absolute velocities or equivalents in the data memory units 32. Then, units 34 will calculate the right timings, such as $t_s$ and $t_o$, with the measured signals and the absolute velocities of the system and the object. With the info of right timing, the data processing units 33 will retrieve the correct data of the absolute velocities or equivalents from the data memory units 32 and send them to the calculation units 34 for result calculation. As an example, if the goal is to measure the absolute velocity of an object, the measured time-series values of the transmission and receiving frequencies of $f_s(t)$ and $f_o(t)$, and the absolute velocity $v_s(t)$ will be stored in the memory units 32. Then the right timing of $t_s$ and $t_o$ will be calculated. Finally, calculation units 34 can accurately calculate the result with the comprehensive absolute velocity information retrieved by the data processing units 33 as:

$$v_o(t_o) = c - \frac{f_0(t_o)(c - v_s(t_s))}{f_s(t_s)}$$

Furthermore, all the calculated results from computing module 3, such as the timings $t_s$ and $t_o$ in this example, can be feedback to modules 1 and 2 for utilization.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A system utilizing the comprehensive information of absolute velocities to improve the capability and accuracy of electromagnetic devices comprising: a) one or more modules measuring parameters for determining the absolute velocities; b) one or more computing modules using the measured parameters to determine the comprehensive information of the absolute velocities and leverage the information to optimize the operation of the electromagnetic devices; c) one or more modules making electromagnetic measurement, calibration, and control using the results from computing modules; and d) one or more communication channels for exchanging information among the modules specified above.

2. The system in claim 1, wherein the one or more modules measuring parameters for determining absolute velocities, further comprise: a) one or more emission sources to generate electromagnetic waves; b) one or more detectors to measure parameters of the electromagnetic waves for determining the absolute velocities; c) one or more clocks for recording the timestamps of the measured parameters; and d) optionally, one or more devices for the amplification of the measured parameters to improve the accuracy of measurement.

3. The system in claim 1, wherein the one or more modules making electromagnetic measurement, calibration, and control, further comprise: a) one or more units for electromagnetic measurement, detection, and positioning operation; b) one or more units that calibrate the desired settings of electromagnetic devices for optimization leveraging the comprehensive information of absolute velocities; and c) one or more units that control the devices to the desired settings for optimization.

4. The system in claim 1, wherein the one or more modules for the computing, further comprise: a) one or more memory units for storing measured and calculated data, including the time-series value of measured parameters for determining the absolute velocities, either real-time or offline; b) one or more units for processing the measured and calculated data in the memory units to determine the comprehensive information of absolute velocities, either real-time or offline; and c) one or more units for computing optimization of electromagnetic devices using comprehensive information of absolute velocities and measured and calculated parameters, either real-time or offline.

5. A method of determining comprehensive information of absolute velocities and leveraging the information to improve performance of electromagnetic devices comprising: a) determining the absolute velocities; b) generating comprehensive information of the absolute velocities and measured and calculated parameters related to determining the absolute velocities; c) calibrating the optimal settings for electromagnetic device and controlling the device states to the desired settings based on the comprehensive information of absolute velocities to improve the performance and accuracy; and d) determining results based on the comprehensive information of the absolute velocities to improve the performance and accuracy of the electromagnetic device.

6. The method of claim 5 wherein the absolute velocity is the velocity of an object relative to the origin of an electromagnetic wave.

7. The method of claim 5 wherein said determining the absolute velocities by changing one or more of the settings of light sources, detectors, and other objects and devices that have an impact on the propagation and measurement of an electromagnetic wave, include but are not limited to, direction, timing, velocity, position, distance, angle, energy, frequency, and wavelength.

8. The method of claim 5 wherein said determining the absolute velocities by measuring one or more of the parameters of an electromagnetic wave, include but not limited to, time, position, velocity, displacement, angle, energy, frequency, and wavelength.

9. The method of claim 5 wherein said generating the comprehensive information includes recording timestamps of the absolute velocities and measured and calculated parameters related to the absolute velocities.

10. The method of claim 8 wherein said measuring one or more parameters for determining parameters of an electromagnetic wave by using instruments, includes but is not limited to reflections, to amplify the measurement accuracy of parameters.

11. The method of claim 8 wherein said measuring one or more parameters for determining the absolute velocities can be done either directly in the device/objects or indirectly in a reference frame.

12. The method of claim 8 wherein said measuring one or more parameters for determining the absolute velocities can be either real-time or offline.

13. The method of claim 8, wherein said measuring one or more parameters for determining the absolute velocities are done in at least three independent directions.

14. The method of claim 5 wherein said comprehensive information of the absolute velocities include the absolute velocities, measured and calculated parameters related to the absolute velocities for all devices and objects related to electromagnetic device operation.

15. The method of claim 5 wherein said comprehensive information of the absolute velocities includes both measured and calculated values and right timings of the values.

16. The method of claim 15 wherein said measuring or calculating right timings for the absolute velocities and measured and calculated parameters are based on the propagation of the electromagnetic wave.

17. The method of claim 5 wherein said determining results based on the comprehensive information of the absolute velocities includes storing a time-series of absolute velocities and measured and calculated parameters, including values and timestamps, in a memory.

18. The method of claim 5 wherein said determining results based on the comprehensive information of the absolute velocities includes retrieving correct values of comprehensive information of absolute velocity for calculation using right timings.

\* \* \* \* \*